US009311046B1

(12) United States Patent
Hicks (10) Patent No.: US 9,311,046 B1
(45) Date of Patent: Apr. 12, 2016

(54) SYSTEM FOR DETECTING ASSOCIATIONS BETWEEN ITEMS

(75) Inventor: Cory Hicks, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 975 days.

(21) Appl. No.: 12/857,384

(22) Filed: Aug. 16, 2010

Related U.S. Application Data

(63) Continuation of application No. 11/863,108, filed on Sep. 27, 2007, now Pat. No. 7,779,040, and a continuation of application No. 11/863,987, filed on Sep. 28, 2007, now Pat. No. 7,827,186.

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,857,179 A | 1/1999 | Vaithyanathan et al. | |
| 6,029,195 A * | 2/2000 | Herz | G06F 17/30867 348/E7.056 |
| 6,356,879 B2 | 3/2002 | Aggarwal et al. | |
| 6,438,579 B1 | 8/2002 | Hosken | |
| 6,615,209 B1 | 9/2003 | Gomes et al. | |
| 6,847,966 B1 | 1/2005 | Sommer et al. | |
| 6,912,505 B2 | 6/2005 | Linden et al. | |
| 6,920,450 B2 | 7/2005 | Aono et al. | |
| 2001/0014868 A1 | 8/2001 | Herz et al. | |
| 2002/0019763 A1 | 2/2002 | Linden et al. | |
| 2002/0199194 A1 | 12/2002 | Ali | |
| 2004/0039657 A1 | 2/2004 | Behrens et al. | |
| 2004/0068581 A1* | 4/2004 | Kinoshita | 709/244 |
| 2005/0076363 A1* | 4/2005 | Dukes et al. | 725/46 |
| 2005/0165782 A1 | 7/2005 | Yamamoto | |
| 2006/0041548 A1 | 2/2006 | Parsons et al. | |
| 2006/0173838 A1* | 8/2006 | Garg | G06Q 30/02 |
| 2006/0195362 A1* | 8/2006 | Jacobi et al. | 705/14 |
| 2006/0277091 A1 | 12/2006 | Kochikar et al. | |
| 2007/0005653 A1* | 1/2007 | Marsh | 707/104.1 |
| 2007/0078849 A1 | 4/2007 | Slothouber | |
| 2007/0186266 A1* | 8/2007 | Watson et al. | 725/134 |

(Continued)

OTHER PUBLICATIONS

Landauer, Thomas, et al. "An Introduction to Latent Semantic Analysis" Discourse Processes, 25, 259-284 (1998).

(Continued)

*Primary Examiner* — Tony Mahmoudi
*Assistant Examiner* — Tuan A Pham
(74) *Attorney, Agent, or Firm* — Knobbe, Martens, Olson & Bear, LLP (57) ABSTRACT

A method of detecting associations between items can include identifying a plurality of items represented in a data repository from which to select items to recommend to a target user, each item including one or more attributes. A degree of fit between an item's attributes and other items is calculated. The degree of fit can indicate the relevance of the attributes of one item to the other item. A degree of association between the two items is calculated based at least in part on the calculated degree of fit. The degree of association between the two items can indicate the relatedness of the two items. Based on this degree of association, an association between the items can be stored in a data repository.

21 Claims, 8 Drawing Sheets

(56) References Cited

U.S. PATENT DOCUMENTS

2008/0097821 A1\* 4/2008 Chickering ........ G06Q 30/0201
705/7.29
2008/0126303 A1\* 5/2008 Park .................. G06F 17/30828

OTHER PUBLICATIONS

Co-owned U.S. Appl. No. 11/754,237, filed May 25, 2007. Filing receipt, specification, and drawings submitted.

\* cited by examiner

|   | Movie A | Movie B | Movie C | Movie D | Movie E | Movie F |
|---|---|---|---|---|---|---|
| Contributor 1 | 1 | 0 | 1 | 1 | 1 | 0 |
| Contributor 2 | 1 | 0 | 0 | 0 | 1 | 1 |
| Contributor 3 | 0 | 0 | 1 | 0 | 0 | 0 |
| Contributor 4 | 1 | 1 | 1 | 0 | 0 | 0 |
| Contributor 5 | 1 | 0 | 0 | 1 | 0 | 1 |
| Contributor 6 | 0 | 0 | 1 | 0 | 1 | 1 |

FIG. 4

$M = LSR^T$

L =

| 0.57 | 0.17 | 0.20 |
|---|---|---|
| 0.45 | −0.40 | −0.56 |
| 0.17 | 0.66 | −0.43 |
| 0.33 | 0.30 | 0.40 |
| 0.40 | −0.50 | 0.23 |
| 0.42 | 0 | 0.50 |

S =

| 3.15 | | | | | |
|---|---|---|---|---|---|
| | 1.73 | | | | |
| | | 1.41 | | | |
| | | | 1.00 | | |
| | | | | 0.85 | |
| | | | | | 0.61 |

$R^T =$

| 0.55 | 0.05 | 0.47 | 0.31 | 0.46 | 0.40 |
|---|---|---|---|---|---|
| −0.25 | 0.39 | 0.76 | −0.19 | −0.03 | −0.41 |
| 0.50 | 0.00 | 0.00 | 0.50 | −0.50 | −0.50 |
| 0.00 | 0.58 | 0.00 | 0.00 | −0.58 | 0.58 |
| 0.58 | −0.13 | 0.03 | −0.78 | −0.16 | −0.04 |
| −0.20 | −0.71 | 0.44 | 0.06 | −0.42 | 0.28 |

Dimension-Reduced Matrix /606

|  | Movie A | Movie B | Movie C | Movie D | Movie E | Movie F |
|---|---|---|---|---|---|---|
| Contributor 1 | 1.17 | 0.21 | 1.06 | 0.75 | 0.56 | 0.35 |
| Contributor 2 | 0.71 | −0.19 | 0.14 | 0.32 | 0.92 | 1.11 |
| Contributor 3 | 0.00 | 0.47 | 1.12 | −0.06 | 0.21 | −0.26 |
| Contributor 4 | 0.69 | 0.25 | 0.87 | 0.47 | 0.20 | −0.05 |
| Contributor 5 | 1.17 | −0.26 | −0.06 | 0.80 | 0.35 | 0.62 |
| Contributor 6 | 0.16 | 0.19 | 0.87 | −0.15 | 1.10 | 0.91 |

Correlation Matrix

|  | Movie A | Movie B | Movie C | Movie D | Movie E |
|---|---|---|---|---|---|
| Movie B | −0.62 |  |  |  |  |
| Movie C | −0.48 | 0.96 |  |  |  |
| Movie D | 0.97 | −0.52 | −0.42 |  |  |
| Movie E | −0.15 | −0.31 | −0.17 | −0.36 |  |
| Movie F | 0.22 | −0.74 | −0.63 | 0.02 | 0.87 |

SYSTEM FOR DETECTING ASSOCIATIONS BETWEEN ITEMS

RELATED CASE

This application is a continuation of U.S. application Ser. No. 11/863,108, filed Sep. 27, 2007, and of U.S. application Ser. No. 11/863,987, filed Sep. 28, 2007, the disclosures of which are hereby incorporated by reference in their entirety.

BACKGROUND

Description of the Related Technology

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses and item's detail page, the detail page may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, or other item selections.

It is also known in the art to analyze the search behaviors of users to detect associations between particular search queries and particular items. The detected associations may be used to rank search result items for display, and/or to supplement a search result set with items that do not match the user's search query. For example, when a user conducts a search, the matching items having the strongest behavior-based associations with the submitted search query may be elevated to a more prominent position in the search results listing; in addition, one or more items that do not match the search query, but which have strong behavior-based associations with the search query, may be added to the search result listing. See, e.g., U.S. Pat. No. 6,185,558.

BRIEF DESCRIPTION OF THE DRAWINGS

Specific embodiments will now be described with reference to the drawings, which are intended to illustrate and not limit the various features of the inventions. In the drawings, similar elements have similar reference numerals.

DETAILED DESCRIPTION

Several different computer-implemented processes will now be described for detecting associations between items to improve item recommendations provided to users. These processes may be embodied individually or in any combination in a multi-user computer system ("system") that implements a recommendation system.

For purposes of illustration, the processes are described primarily in the context of a system that detects associations among catalog items for the purpose of recommending such items to users of an e-commerce web site. As will be apparent, however, the disclosed processes can also be used in other types of systems, and can be used to recommend other types of items, such as but not limited to web sites, news articles, blogs, podcasts, travel destinations, service providers, other users, events, discussion boards, photos and other images, online videos, tagged items, and user-generated lists of items. In addition, the disclosed processes need not be implemented as part of, or in conjunction with, a web site.

As used herein, the term "item" is used interchangeably to refer to an item itself (e.g., a particular product) and to its description or representation in an electronic catalog system. As will be apparent from the context in which it is used, the term is also sometimes used herein to refer only to the item itself or only to its representation in the catalog system.

In some instances, behavior-based associations may generate low quality associations or no associations at all for certain items. The quantity of behavioral data collected for a particular item, for instance, may be insufficient to create behavior-based associations for that item. This may be the case when new items are added to an electronic catalog or when new web pages or documents are added to a data repository. This problem is sometimes referred to as the "cold-start" problem. In addition, the quantity of behavioral data can also be insufficient to create behavior-based associations for items that are rarely purchased. Moreover, behavior-based associations can also generate low-quality associations for popular items. Popular items tend to be associated behaviorally with many other items simply because many people buy the popular items along with other unrelated items. As a result, a best selling novel may be behaviorally-associated with an unrelated item such as a pen knife.

In certain embodiments, these problems are addressed by providing computer-implemented systems and methods for detecting associations among "behavior-deficient" items (generally items for which the collected user activity data of a particular type is insufficient to create meaningful or reliable behavior-based associations). Various embodiments may also be applied to non-behavior-deficient items.

Figure 1:
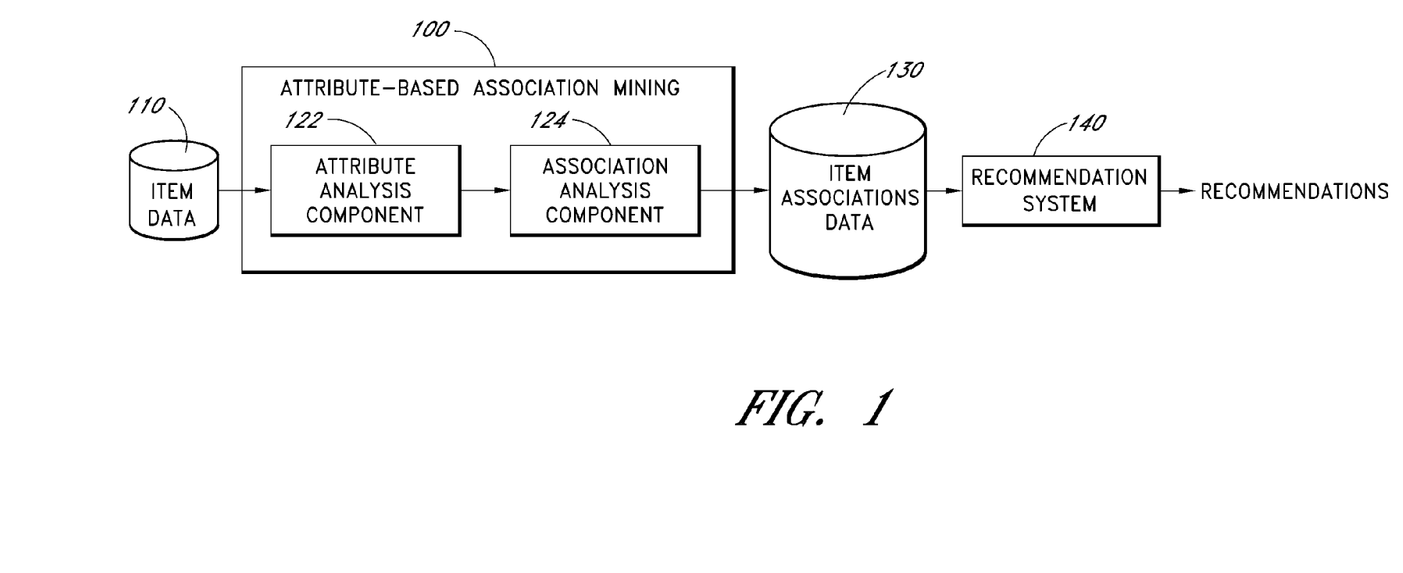
FIG. 1 illustrates an embodiment of an association mining system.

Turning to FIG. 1, an embodiment of an attribute-based association mining system 100 is shown that addresses the foregoing problems, among others. The association mining system 100 receives data regarding items from an item data repository 110. The association mining system 100 analyzes this data to determine which items should be associated together. Details about associated items are passed from the association mining system 100 to an item association data repository 130. A recommendation system 140 uses the association data stored in the repository 130 to recommend items to a target user.

The item data repository 110 includes one or more computer storage devices for storing item data. In the context of an electronic catalog website, these items might include books, movies, music, television shows, apparel, electronic books ("e-books"), electronics, academic papers, and the like. The item data repository 110 stores data regarding the items. This item data can include data regarding attributes of the items, product descriptions, and customer-supplied data such as ratings and reviews, among other data types.

Different types of items may have different types of attributes. The attributes of a book, for example, might include the author, publisher, title, and the like, whereas the attributes of apparel might include size, color, brand, and so forth. In certain embodiments, the attributes of movies and recorded television shows can include contributors, which include the people or entities that took part in or otherwise contributed to the movies or shows. Some example contributors include actors, producers, writers, directors, and narrators (such as narrators in Anime). In addition, in some embodiments film or television studios, including independent film studios, could be considered contributors. Moreover, artists who contributed to a soundtrack of a movie could also be considered contributors to that movie.

The attribute data stored in the item data repository 110 is provided to the association mining system 100. The association mining system 100 uses the attribute data and/or other forms of data to detect associations between items. In one embodiment, an attribute analysis component 122 of the association mining system 100 retrieves attribute data and detects associations by analyzing the data. The attribute analysis component 122 detects these associations in various embodiments by determining how well certain attributes fit with various items or other attributes. For example, the attribute analysis component 122 can determine how well an actor might fit with a particular movie he or she did not participate in, based on the movies the actor has actually participated in and/or based on other actors this actor has worked with. In an embodiment, determining how well contributors of one movie fit with another movie (or with the contributors of the other movie) facilitates detecting associations between those movies.

Certain observations facilitate the attribute analysis component 122 detecting associations between items such as movies. For movies, recorded television shows, and the like, many contributors tend to remain more or less in a limited set of genres or sub-genres throughout their entire careers. When a contributor that is known for contributing to a specific genre of movie, for example, breaks from this mold and takes part in a movie within another genre, fans of that contributor may still watch and enjoy the new movie. In addition, contributors may tend to work with other contributors that have similar tastes as themselves. Therefore, if an actor D who is unknown to the user has participated in several movies with actors A, B, and C, which the user is known to like, then there is a reasonably high probability that the user will enjoy actor D's movies. Certain of these insights can also be extended to other items, including books and music.

In one implementation, the attributes analysis component 122 determines how well attributes fit with items or other attributes by assigning numerical values to the attributes of each item and by analyzing these values. The values may be assigned based on whether a particular attribute is associated with an item, such as whether an actor participated in a given movie. The values may also be assigned based on the attribute's significance or importance to that item. For example, an actor may be given a higher value if that actor's importance in the film was greater, as may be determined by customer ratings or reviews. Other methods for determining the values of the attributes are described below with respect to FIG. 4.

The attribute values of certain embodiments are stored in a matrix, which may be implemented by any suitable data structure(s), such as a multi-dimensional array. In one embodiment, the columns of the matrix represent items and the rows of the matrix represent attributes. However, it will be understood that an equivalent analysis may be performed on a transposed version of the matrix (e.g., with the rows representing items and the columns representing attributes), or using a data arrangement or construct other than a matrix. An example matrix of items and attributes is described in more detail below with respect to FIG. 4.

The attributes analysis component 122, in certain embodiments, uses an extension of natural language processing techniques to analyze the attribute values and thereby detect associations between items. One such technique is related to latent semantic analysis (LSA). LSA is a natural language processing technique that attempts to determine how similar two documents are by analyzing which words in those documents are interchangeable and by how much. In an embodiment, the attributes analysis component 122 extends LSA to detecting associations between items by analyzing which attributes of the items are interchangeable and by how much. An example embodiment of this technique is described in detail below, with respect to FIGS. 3 through 7.

In addition, the attributes analysis component 122 may use other techniques to detect associations between items, such as data compression and other digital signal processing techniques. For example, certain JPEG image compression techniques may be used to analyze the matrix of values. The use of compression techniques is explained below with respect to FIG. 5. In addition, the technique of principal component analysis may also be used in place of or in conjunction with LSA.

The attributes analysis component 122 in certain embodiments provides details regarding the associations between items to the association analysis component 124. The association analysis component 124 calculates how associated or related items are, using, for example, a correlation algorithm. The association analysis component 124 then passes the association information to an item associations data repository 130, which stores the associations between items.

Thereafter, a recommendation system 140 can retrieve the associations between items from the item associations data repository 130. Using this associations information, possibly together with behavior-based association information, the recommendation system 140 can generate recommendations for a target user. An example recommendation system is described below with respect to FIG. 8.

Figure 2:
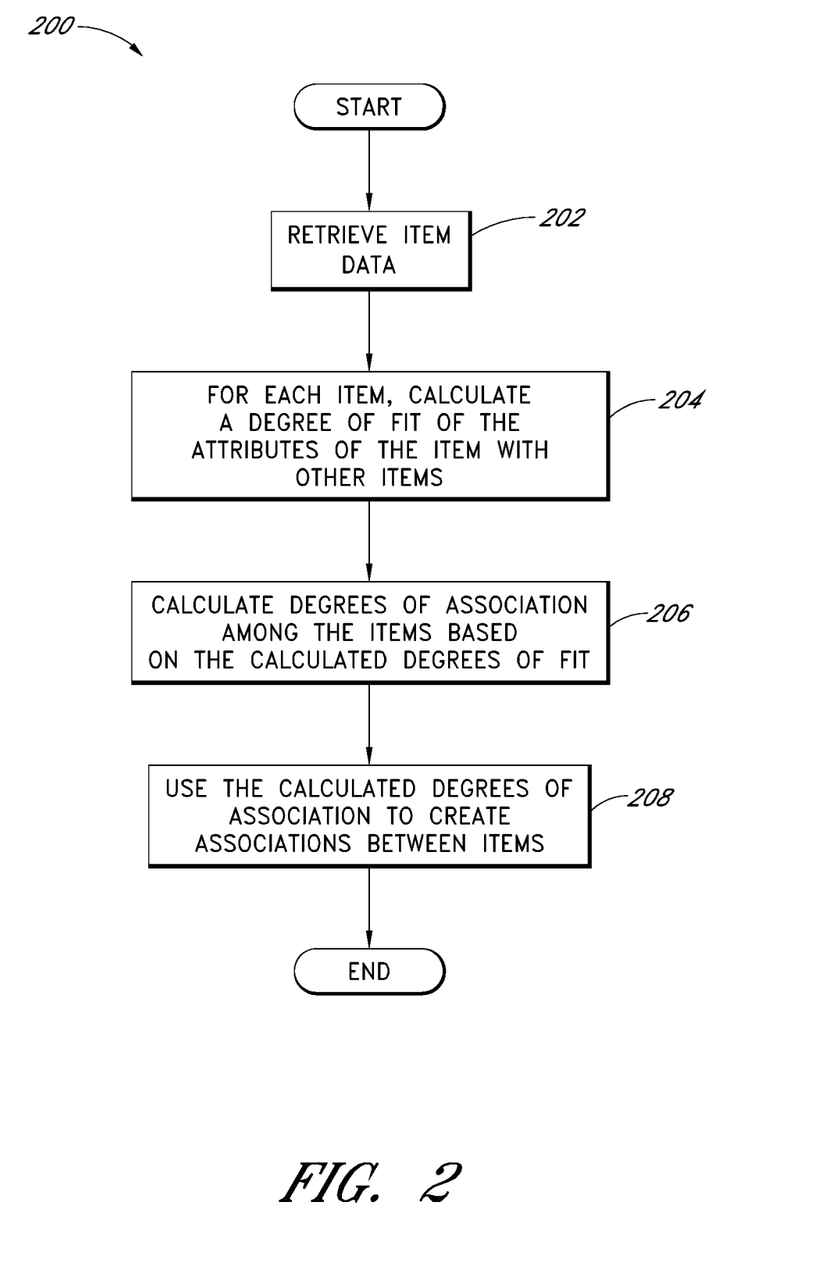
FIG. 2 illustrates an embodiment of a process for detecting associations between items.

FIG. 2 illustrates an embodiment of a process 200 for detecting associations between items. The process 200 is implemented in one embodiment by an association mining system, such as the association mining system 100 of FIG. 1. Advantageously, the process 200 facilitates detecting associations between behavior-deficient items, among others.

The process 200 begins at block 202 by retrieving item data. This block may be performed by an attributes analysis component, such as the attributes analysis component 122 of FIG. 1. The item data can include data regarding attributes of the items, product descriptions, and customer-supplied data such as ratings and reviews. However, in one embodiment, the process 200 retrieves all or mostly attribute data.

At block 204, for each item, the process 200 calculates a degree of fit of the attributes of the item with another item or items. In certain embodiments, this is equivalent to calculating a degree of fit of the attributes of the item with the attributes of the other items. In an embodiment, calculating a degree of fit includes performing latent semantic analysis techniques to detect associations between items. As described above, this block may include, for example, detecting which actors might be interchangeable with other actors. The more an actor "fits" with other actors, the greater the likelihood there is of being an association between two movies or the like. A more detailed example of these techniques is discussed below with respect to FIGS. 3 through 7.

Continuing, the process 200 at block 206 calculates degrees of association among the items based on the calculated degrees of fit. In this block, the process 200 calculates how associated items are, using a correlation algorithm or the like. Finally, the process 200 at block 208 uses the calculated degrees of association to create associations between items in computer storage. This block may be performed, for example, by storing an association between items in the item associations data repository 130 of FIG. 1.

Figure 3:
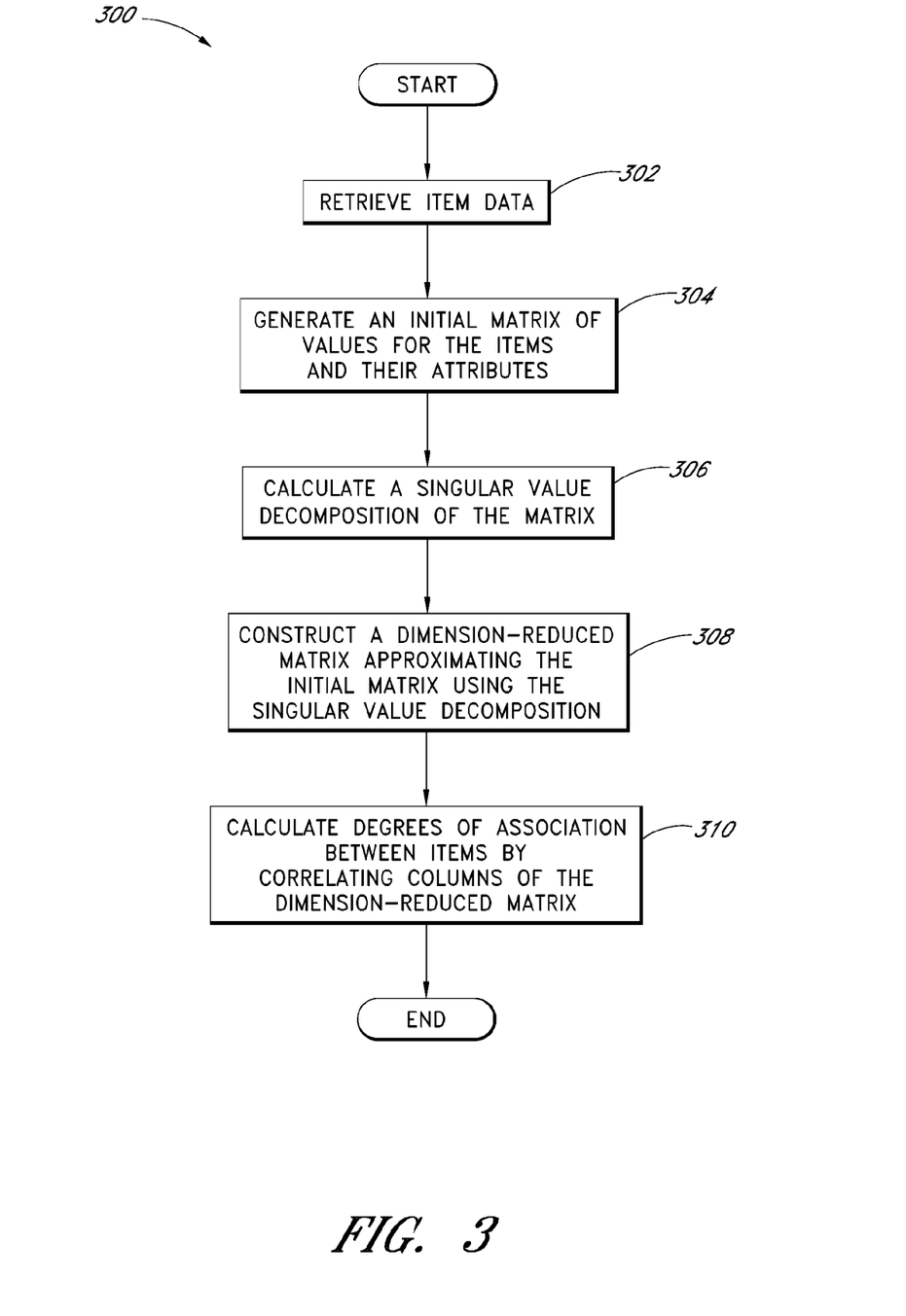
FIG. 3 illustrates a more detailed embodiment of a process for detecting associations between items.

FIG. 3 illustrates a more detailed embodiment of a process 300 for detecting associations between items. Like the process 200, the process 300 is implemented in one embodiment by an association mining system, such as the association mining system 100 of FIG. 1. The process 300 begins at block 302 by retrieving item data. This block may be performed by an attributes analysis component, such as the attributes analysis component 122 of FIG. 1.

Figure 4:
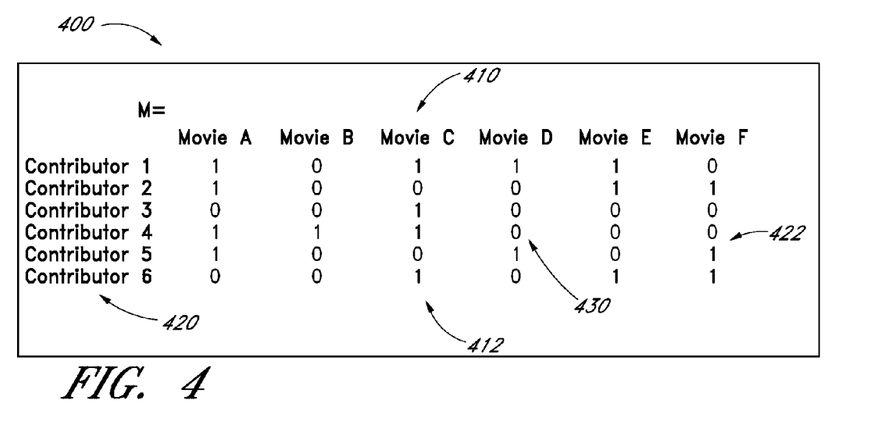
FIG. 4 illustrates an example matrix of attribute values in accordance with certain embodiments.

At block 304, the process 300 generates an initial matrix of values for the items and their attributes. One example matrix 400 is shown in FIG. 4. The items represented in the matrix 400 are movies 410 (movies A through F), which are represented as the columns 412 of the matrix 400. The attributes of the movies include contributors 420 (contributors 1 through 6), which are represented as the rows 422 of the matrix 400. As described above, the contributors 420 may be actors, producers, writers, directors, narrators, or the like.

Six movies 410 and six contributors 420 are shown. While the number of movies 410 and contributors 420 in this example are equal, they need not be. In addition, the matrix 400 is denoted by the bold upper-case letter "M." By common convention, other matrices described herein are sometimes also represented by a bold upper-case letter.

Values 430 are assigned to the contributors 420 for each movie 410. In the embodiment shown, these values 430 are either 1 or 0. If a contributor 420 contributed to a particular movie 410, that contributor 420 is assigned a "1" in the column corresponding to that particular movie 420. Thus, for example, contributor 2 has a "1" in the columns corresponding to movies A, E, and F, signifying that this contributor has participated in these movies. Conversely, if a contributor 420 has not participated in a movie, a "0" is assigned to the column corresponding to that movie.

There are many other ways to assign values 430 to the contributors 420. In one implementation, values 430 are assigned to the contributors 420 based on their contributor 420 type. For instance, different values 430 might be assigned to actors, producers, and directors, reflecting the relative importance that these contributors have to a movie. Actors, in some embodiments, may be considered to have contributed more to a movie 410 than producers or directors, and actors might therefore be assigned a higher value 430. Likewise, producers might be considered to have contributed more to a movie 410 than directors and likewise be assigned a higher value 430. In one particular embodiment, actors are assigned a value 430 of 1, producers are assigned a value 430 of 0.8, and directors are assigned a value 430 of 0.5. Of course, these numbers may be scaled while keeping the same proportions; e.g., actors could have a value 430 of 10, producers a value 430 of 8, and directors a value 430 of 5. In addition, other proportions are possible, as are other ranges and values 430.

In another embodiment, contributors 420 are assigned values 430 based on the degree to which they contributed to a particular movie 410. This degree may be determined, for example, by analyzing user ratings and reviews of those contributors 420. Such user ratings and reviews may, for example, be collected via an interactive web site. In one embodiment, if users rate actors based on whether they are stars or have lead roles, this rating may be used to raise their assigned value 430 (except perhaps in the case of very popular actors). As an example, if a contributor 420 has been rated by users as a lead actor, the contributor 420 might be assigned a higher value 430 than other actors.

On the other hand, as very popular actors can tend to appear in many films, less well-known actors, including supporting actors, can be assigned higher values 430 than popular actors. This value 430 assignment reflects the principle that popular actors tend to work with many other actors, and thus giving popular actors higher values 430 may cause associations to be detected between movies 410 that are substantially unrelated. Similarly, some directors and producers are very prolific. A certain subset of these contributors 420 direct or produce several unpopular movies each year. In contrast, some very popular contributors 420 director direct or produce very few movies each year. Thus, in one embodiment, prolific directors and/or producers may be assigned a lower value 430 than less prolific directors and producers.

The popularity of contributors 420 can be determined in a number of ways. User ratings and reviews may provide such information. The number of movies 410 a contributor 420 participated in may also indicate popularity. Popularity can also be determined by analyzing how many search results for the contributor's 420 name appear in a search engine, with more results indicating greater popularity. The number of awards a contributor 420 received, the amount of money the contributor 420 made in a given year, and other factors may also be taken into account in determining popularity.

In another embodiment, contributors 420 are assigned values 430 based on the popularity of the movie(s) 410 that the contributor 420 participated in. If a relatively new or unpopular contributor 420 contributed to a very popular movie 410, for instance, this contributor 420 might be given more weight. Conversely, a popular contributor 420 who contributed to a very unpopular movie 410 might be given less weight.

It should be noted that any of the above techniques may be used together to produce a combined value for a given contributor 420.

In an embodiment, the popularity of contributors 420, user ratings of contributors, and possibly other factors are used as multipliers or weights on initial values 430 assigned to the contributors 420. For example, contributors 420 could be initially assigned binary values 430 such as those shown (e.g., 1 or 0). Thereafter, the initially assigned value 430 could be multiplied or weighted according to any subset of the factors described above, such as contributor type, popularity, user ratings, and the like.

Referring back to FIG. 3, the process 300 of certain embodiments calculates a singular value decomposition (SVD) of the matrix 400 at block 306. This block may be implemented by, for example, the attribute analysis component 120 of FIG. 1. This block is one implementation of performing latent semantic analysis-type techniques to compare the attributes (e.g., contributors 420) of the movies 410. Other techniques not shown may be used in place of the SVD, such as principal component analysis.

Figure 5:
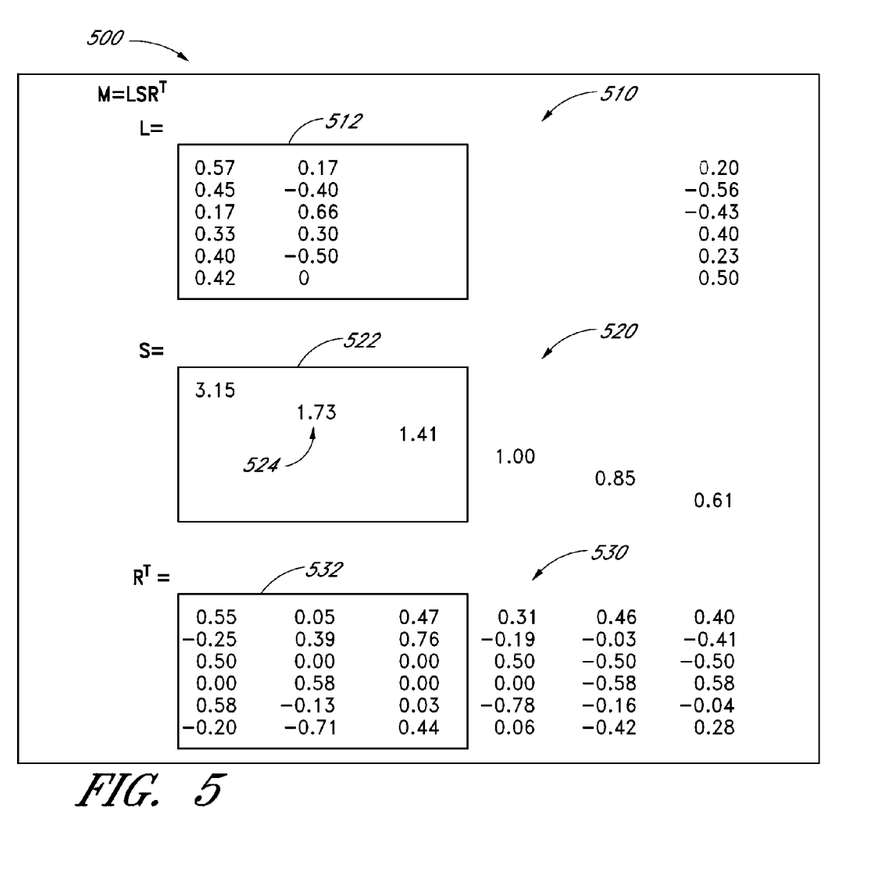
FIG. 5 illustrates an example singular value decomposition of the matrix of FIG. 4.

An example SVD of the matrix M 400 is shown in FIG. 5. The SVD decomposes or factorizes the matrix M 400 into three component matrices, L, S, and $R^T$. The L matrix is a left matrix 510, the S matrix is a singular value matrix 520, and the $R^T$ is a right matrix transposed 530 (the right matrix is transposed for reasons understood to those of skill in the art). These matrices may be matrix-multiplied together to reproduce the original matrix 400 M. In other words, $M=LSR^T$.

The singular value matrix 520 includes one or more singular values 524. In the present example, there are six singular values 524, ranging from 3.15 to 0.61 in decreasing order of magnitude. These singular values 524 are along the diagonal of the singular value matrix 520. All other values in this matrix are zero, such that the singular value matrix 520 is a diagonal matrix. For clarity, the zeros are not shown.

The dimension of the matrix 400 is equal to the rank of the matrix 400, which can be defined as the number of linearly independent column or row vectors of the matrix 400. The dimension of the matrix 400 is also equivalent to the number of singular values 524 in the singular value matrix 520. Thus, in the example embodiment, the dimension of the matrix 510 is six because there are six singular values 524. If one or more of the singular values 524 were zero instead, the dimension of the matrix 400 would be less.

Referring again to FIG. 3, the process 300 continues by constructing a reduced-dimension matrix approximating the initial matrix 400 at block 308. This block is performed in one embodiment by reducing the dimension of the SVD and by matrix-multiplying the matrices of the reduced-dimension SVD. Referring again to FIG. 5, reducing the dimension of the SVD can include reducing the dimension of one or more of the left, singular value, and right transpose matrices 510, 520, 530. For example, the dimension of the singular value matrix 520 can be reduced by removing some of the singular values 524, or equivalently, by setting some of the singular values 524 to zero. Alternatively, the dimension of the left or right transpose matrices 510, 530 could be reduced by removing or setting certain columns of these matrices to zero. For clarity, the remainder of this application will refer solely to the removal or deletion of the singular values 524, although it will be understood that removing columns of the left or right transpose matrices 510, 530 could be done interchangeably.

When an appropriate number of singular values 524 are removed, the reduced-dimension matrix is a least-squares best fit of the initial matrix 400. That is, the reduced-dimension matrix approximates the initial matrix 400. Advantageously, calculating the reduced-dimension matrix therefore determines degrees of fit between the attributes (e.g., the contributors 420), as will be explained in more detail below with respect to FIG. 6.

As an alternative to using the SVD to reduce the dimension of the initial matrix 400, other digital signal processing and/or compression techniques can be used to approximate the initial matrix 400. For instance, JPEG compression can be used to reduce the amount of information in the initial matrix 400 and thereby approximate the initial matrix 400. Analysis on approximate matrices generated in this manner may be conducted in the same or a similar manner as the analysis explained below with respect to FIG. 6.

Turning again to FIG. 5, in one embodiment, the number of singular values 524 is reduced by comparing the total number of items 410 in the initial matrix 400 with the singular values 524. In one implementation, the highest-value singular value 524 is compared with the number of items 410. If this singular value 524 is greater than or equal to the number of items 410, then all remaining singular values 524 are deleted. If not, then this singular value 524 is summed with the next-lowest singular value 524. If the sum of the two singular values 524 is greater than or equal to the number of items 410, then the remaining singular values 524 are deleted. However, if not, this process continues by summing singular values 524 and comparing the sum with the number of items 410 until the sum is greater than or equal to the number of items 410.

For example, in FIG. 4, there are six (6) items (e.g., the movies 410). The highest-valued singular value 524 is 3.15, which is less than 6. Hence, 3.15 is next added to the next-highest singular value 524, 1.73, for a sum of 4.88. As 4.88 is less than 6, 4.88 is next added to the next-highest singular value 524, 1.41, making a sum of 6.29. This sum exceeds the number of items 410, and hence the remaining singular values 524 are removed.

A box 522 is drawn around the three highest singular values 524, signifying that these singular values 524 will be kept while the values 1.00, 0.85, and 0.61 will be removed (or equivalently, set to zero). The singular value matrix 520 with these singular values 524 removed is a dimension-reduced singular value matrix 520, with a dimension equal to the number of remaining singular values 524.

To construct a dimension-reduced matrix approximating the initial matrix 400, the dimension-reduced singular value matrix 520 is matrix-multiplied with the left and right transpose matrices 510, 530. The zero values outside of the box 522 of the matrix 520 multiply with the numbers outside of the boxes 512, 532 of the left and right transpose matrices 510, 530, resulting in a product of zero for each of these numbers. Hence, the numbers in the left and right transpose matrices 510, 530 outside of the boxes 512, 532 do not contribute to the constructed dimension-reduced matrix.

There are other ways to determine how many singular values 524 to remove. For example, all the singular values 524 could first be summed. Then singular values 524 could be selected in decreasing order of magnitude until the sum of the selected values 524 equals or exceeds a predetermined percentage of the sum of all the singular values 524. The remaining, unselected values 524 could then be removed. Another method is to select singular values 524 in order of decreasing magnitude until the sum of the selected values 524 reaches a predetermined amount. Thereafter, the remaining singular values 524 could be removed. A further method, called the Kaiser method, is to remove all singular values 524 having a magnitude less than one (1). One or more of these methods may also be combined in certain embodiments.

Figure 6:
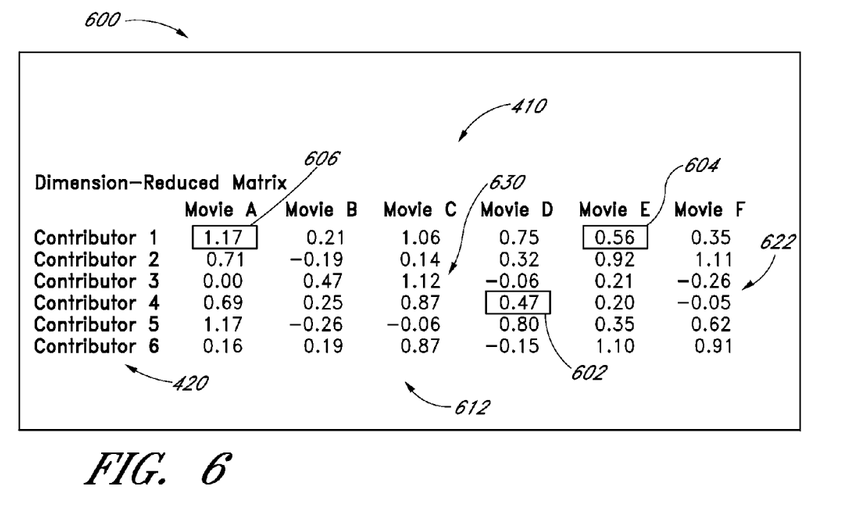
FIG. 6 illustrates an example matrix reconstructed from a dimension-reduced singular value decomposition.

FIG. 6 shows an example dimension-reduced matrix 600 constructed according to block 310 of the process 300. Like the initial matrix 400, the dimension-reduced matrix 600 includes the movies 410 represented by the columns of the matrix 600 and the contributors 420 represented by the rows of the matrix 600. Also like the initial matrix 400, values 630 are assigned to the contributors 420 for each movie 410. However, these values 630 are different from the values 430 in the initial matrix 400 due to the reduced dimensionality of the matrix 600.

Since the dimension-reduced matrix 600 is an approximation to the initial matrix 400, the dimension-reduced matrix 600 effectively estimates how well the contributors 420 would fit in a given movie 410. Viewed another way, the dimension-reduced matrix 600 estimates the degree to which the contributors 420 would fit with other contributors 420. Thus, the dimension-reduced matrix 600 predicts which actors, for instance, would be most likely to work with other actors or star in other movies. More generally, the dimension-reduced matrix 600 predicts the degree to which attributes fit with each another and with other items.

Turning to a specific example, certain values 630 that were 1s in the initial matrix 400 have been increased or decreased, and certain values 630 that were 0s in the initial matrix 400 have also been increased or decreased. For example, the value 0 for contributor 4 in the initial matrix 400 under movie D has been replaced with 0.47 (see box 602) in the dimension-reduced matrix 600. The value 0.47 indicates that movie D could be a reasonably good fit for this contributor 420, even though this contributor 420 did not actually contribute to movie D. Conversely, contributor 1, who actually contributed to movie E, has a value of 0.56 (see box 604) for movie E, indicating that this movie 410 may have been uncharacteristic for this contributor 620. In addition, contributor 1 also contributed to movie A and received an increase in value from 1 to 1.17 (see box 606) for movie A. Hence, this movie 410 is likely highly representative of movies 410 that contributor 1 would participate in.

The insights provided by the dimension-reduced matrix 600 in certain embodiments provide a basis for creating associations between items such as movies. Referring again to FIG. 3, the process 300 of certain embodiments at block 310 calculates degrees of association between items by correlating columns of the reduced-dimension matrix 600. Correlation can indicate the strength of a linear relationship between two sets of attribute values 630.

Figure 7:
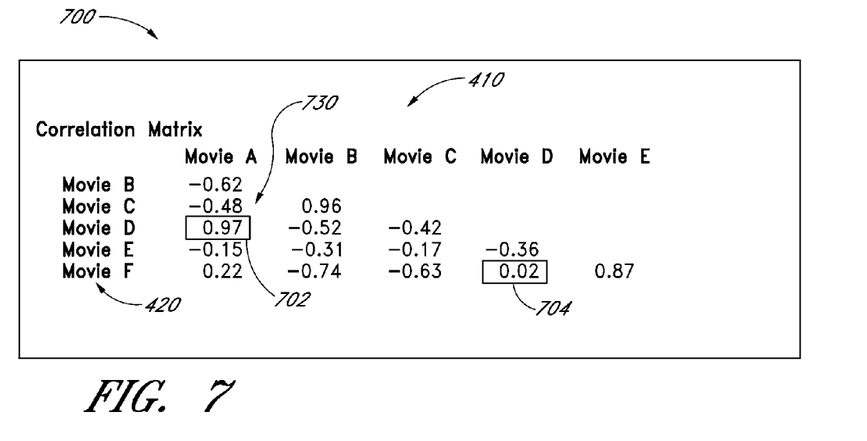
FIG. 7 illustrates an example correlation matrix.

An example table 700 of correlation values between columns (e.g., between the movies 410) of the matrix 600 is shown in FIG. 7. The correlation scores 730 in the example table 700 were generated using the Pearson correlation algorithm, having a scale of (−1 to 1), where scores close to −1 or 1 tend to indicate high correlation and scores close to 0 tend to indicate low correlation. Other correlation algorithms may also be used.

The correlation scores can indicate how associated or related the movies 410 are. For example, movies A and D have a correlation score of 0.97, indicating that these movies 410 are likely quite related. Movies D and F, on the other hand, have a correlation score of 0.02, indicating that these movies 410 are likely quite different. In some instances, movies 410 or other items that appear to be very different due to, for example, being in a different genre, may actually have high correlation scores. A drama movie, for instance, might be highly correlated with a science fiction movie because several actors of one would have fit well with the other.

In an embodiment, the associations between items, represented as correlation scores, can be stored in a database, such as the item associations data repository 130 of FIG. 1. The score for a particular association may further take into account scores from other association detecting systems. For instance, the correlation score for an item could be combined with a behavioral score (if one were available) to create a combined association score. Alternatively, separate correlation and behavioral scores might be maintained and used to generate recommendations.

The SVD analysis of certain embodiments advantageously facilitates detecting associations between items based on the context of some or all the items in the matrix 400. As an example, a first contributor 420 might have participated in a first movie 410 but not a second, and a second contributor 420 might have participated in the second movie 410 but not the first. A degree of association could be detected between these movies 410 based at least in part on the extent to which the first and second contributors 420 have co-contributed to other movies 410 in the matrix 400. Thus, the context of the various movies 410 in the matrix 400 indicates that if the user enjoys movies including the first contributor 420, the user might also enjoy movies including the second contributor 420.

In another example, first and second contributors 420 might have not co-contributed to a movie 410 but might have each independently contributed with a third contributor 420 in other movies 410. Thus, the context of the matrix 400 indicates that if the user enjoys movies including the first contributor 420, the user might also enjoy movies including the second contributor 420. More generally, a first degree of association could be detected between the first contributor 420 and the second movie 410, and a second degree of association could be detected between the second contributor 420 and the first movie 410. Based on these degrees of association, a degree of association could be assessed between the first and second movies 410.

While the process 300 has been described primarily in the context of movies and contributors to movies, the process 300 may be used with many other types of items. For example, the process 300 may be used to compare apparel, to determine which items of apparel may be similar to or associated with others. In an embodiment, words in product descriptions of apparel items may be analyzed by the techniques of the process 300. An example process for analyzing apparel items is described below with respect to FIG. 8.

In another embodiment, the process 300 may be used to detect associations between attributes such as contributors to various works (e.g., movies, books, television shows, music, or the like). These embodiments may facilitate users determining, for example, which actors might be interchangeable with other actors that the user likes. In effect, the roles of items and attributes might be reversed such that the attributes are considered as the "items" and the items are considered as the "attributes." Thus, for example, contributors can be considered as "items" and the work(s) they contributed to can be considered as their "attributes." These embodiments may facilitate users determining, for example, which actors may be interchangeable with other actors that the user likes.

In one implementation, associations are detected between contributors by transposing the initial matrix 400 prior to calculating an SVD and reducing the dimension of the transposed initial matrix. Thus, the contributors 420 become the columns and the movies 410 become the rows of the transposed initial matrix. Thereafter, the columns of the transposed initial matrix can be correlated to determine associations between contributors. This association data can be used to recommend contributors to users, enabling the users to browse works related to those contributors. In addition, the association data can be used to recommend items directly to the users.

Other variations and configurations of the process 300 may be used to detect associations between items. For instance, in certain embodiments, items from different item categories can be compared. As one example, items in the categories of books, music, videos, and DVDs could be compared together in a single matrix 400. Using the analysis techniques of the process 300 described above, associations can be detected between these items. Thus, an association might be detected between a business book and a DVD of a business-themed comedy. Or, an association might be detected between an artist's music CD and a movie, where the artist would be considered likely to contribute to the soundtrack of the movie.

Figure 8:
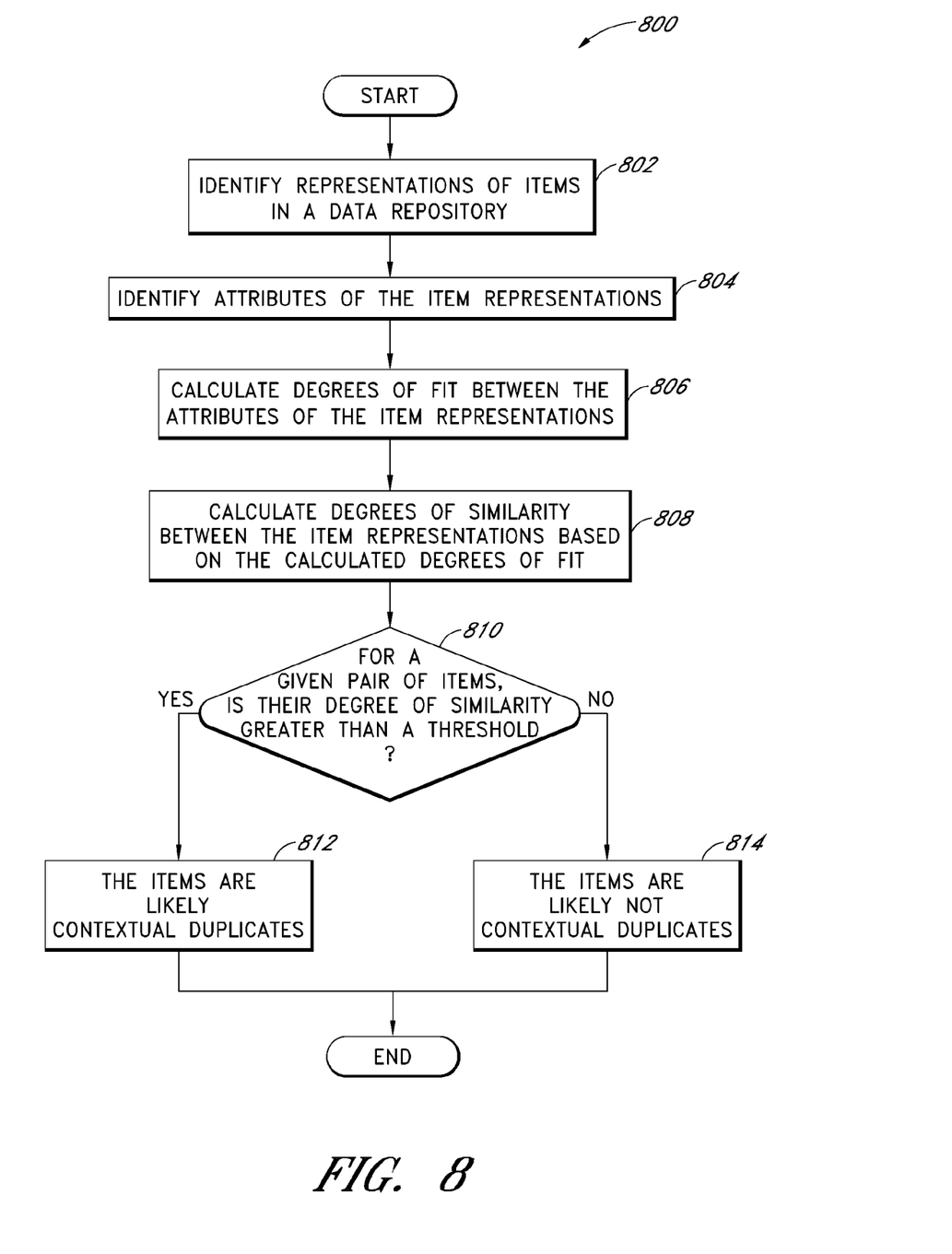
FIG. 8 illustrates an embodiment of a process for detecting context-based duplicate or similar items.

FIG. 8 illustrates an embodiment of a process 800 for detecting context-based duplicate or similar items. Like the processes 200 and 300, the process 800 can be implemented by an association mining system, such as the association mining system 100 of FIG. 1.

In some electronic catalogs, several duplicate items can be found. Search results from searching the catalog can therefore produce unwanted duplicates. In addition, unwanted duplicates can also be provided in user recommendation lists. Moreover, some items that are very similar but yet not true duplicates can be difficult to detect and prune from search and recommendation results.

Duplicate items can exist in a catalog for many reasons. For instance, different vendors might submit different product listings for the same item to the catalog. The product listings might describe the items slightly differently, making it difficult to detect and remove these duplicates. Another possible source of duplicate or near-duplicate items is variation sets. Variation sets include items that are the same except for one or two characteristics, such as color, size, edition type (e.g., limited edition), or the like. Additionally, other non-variation set items might also be near-duplicates. For example, a short-sleeve pink dress shirt and a long-sleeve dress shirt with a slightly different collar might be considered near-duplicates. Non-variation set near-duplicates can be particularly difficult to detect.

Certain embodiments of the process 800 therefore beneficially detect duplicates and near duplicates based on the context of multiple items, thereby facilitating improved catalog pruning, search results, and recommendations. The process 800 of certain embodiments uses natural language processing techniques, such as those described above, to detect contextual duplicates. For example, the process 800 can use the SVD techniques described above to detect contextually duplicate items. In addition, the process 800 can detect contextually similar items that can beneficially be used in search results and recommendations lists.

The process 800 begins in one embodiment by identifying representations of items stored in a data repository at block 802. This block may be performed by an attributes analysis component, such as the attributes analysis component 122 of FIG. 1. The representations can include product descriptions, titles of the items, keywords used to describe the items such as style keywords, combinations of the same, and the like. The item representations can be selected from any item category, including but not limited to movies, apparel, music, books, e-books, television shows, electronics, and combinations of the same or the like. For purposes of illustration, the remainder of the process 800 will be described with respect to apparel, as many of the aforementioned duplicate problems can be pronounced for apparel due to rapid turnover of inventory.

At block 804, the process 800 identifies attributes of the item representations. The attributes of certain embodiments include textual terms. Thus, any word or phrase in a product description, for example, can be a textual term or attribute. Referring again to the short sleeve pink shirt example above, possible attributes might include "pink," "short sleeve," and "dress shirt." If the representation of the pink shirt also said, for example, "styled in Italy," "exquisite single needle tailoring," and "reversible cuffs," one or more of these words or phrases could also be used as attributes.

Certain embodiments (not shown) of the process 800 also clean textual terms prior to proceeding to later blocks in the process 800. Cleaning textual terms can include trimming words down to their roots by removing stems such as suffixes and prefixes. In addition, cleaning can include removing "stop words," which include words that are commonly used to describe many products. Examples stop words include "new," "improved," and the like. The cleaning process can facilitate better analysis of the textual terms in some implementations.

In some embodiments, textual term attributes can be analyzed together with other types of item attributes, such as those described above with respect to FIGS. 1 through 7. For example, contributors could be used in addition to textual terms. Examples of apparel contributors could include a designer, a place of manufacture (e.g., Italy), or the like.

Continuing, the process 800 at block 806 calculates degrees of fit between the attributes of the item representations. In certain embodiments, this can be equivalent to calculating degrees of fit of the attributes of some item representations with other item representations. In an embodiment, calculating degrees of fit includes performing latent semantic analysis techniques to detect similarities between item representations. Thus, any of the techniques described above with respect to FIGS. 1 through 7 may be used with the process 800.

Referring to the techniques of the process 300, each attribute (e.g., textual term) can be assigned to a row in an initial matrix. The names or titles of the items can be assigned to columns of the initial matrix. An SVD or other compression or signal processing technique could then be performed on the matrix. For example, a dimension reduced form of the SVD could be calculated, resulting in a reduced-dimension matrix that can be further analyzed.

Advantageously, using the SVD or related techniques in certain embodiments provides a context in which to compare the item representations, thereby facilitating comparisons between items. By comparing a group of item representations in a matrix or the like, the item representations are compared in the context of other item representations. The value that one item representation's attribute has in the initial matrix can influence the value that another item representation's attribute takes on in the reduced-dimension matrix (through, for example, matrix multiplication of the reduced-dimension SVD). Thus, items that might not initially appear to be duplicates might be considered "contextual" duplicates in the context of the other items in the matrix. In particular, the SVD analysis can detect the degree to which textual terms are used synonymously or substantially synonymously in the context of the matrix of items. For example, SVD analysis could be used to determine that a "high-end sport coat" and a "designer sport coat" are contextual duplicates because the terms "high-end" and "designer" are synonymous or substantially synonymous within the context of an apparel items matrix.

Continuing, the process 800 at block 808 can calculate degrees of contextual similarity between item representations based on the calculated degrees of fit. In many instances, the degree of contextual similarity between item representations can reflect the degree of similarity between the items. In this block, the process 800 can calculate how similar item representations are, using a correlation algorithm or the like. One example of a correlation algorithm that may be used is described above with respect to FIG. 7. In certain embodiments, the correlation algorithm or other similarity calculation produces contextual similarity scores between items. These scores may be stored in an item associations data repository or the like.

At block 810, for a given pair of item representations, the process 800 determines whether their degree of similarity exceeds a threshold value. If so, the process 800 at block 812 determines that the items are likely contextual duplicates.

Otherwise, the process 800 at block 814 determines that the items are likely not contextual duplicates. In one embodiment, if a pair of item representations have a correlation score of 0.85 or greater, these items can be considered to be contextual duplicates. However, this number could much higher or lower in different contexts. For example, a higher correlation score might not, in some contexts, be high enough to indicate the presence of contextual duplicates. Conversely, a lower score in some contexts might indicate the presence of contextual duplicates.

Other factors can be used in addition to or in place of identifying contextual duplicates using a threshold. One example factor is a browse node that the item representations are in. Browse nodes in one embodiment are categories or the like that item representations are associated with, such as "electronics," "men's wear," or the like. One item can be represented in multiple browse nodes. In certain embodiments, if two items are represented in the same browse node, this fact can weigh in favor of finding that the two items are contextual duplicates. Another factor that can influence a determination of contextual duplicity is the origination of the item representations. If the item representations of two items are provided by the same vendor, then these items are less likely to be contextual duplicates. However, if they are provided by different vendors, then this factor can weigh toward finding that the two items are contextual duplicates.

The contextual analysis described herein can beneficially be used in many ways. For instance, items that are considered contextual duplicates could be removed from an electronic catalog. In addition, recommendation results could also be filtered by removing contextual duplicates.

Advantageously, the process 800 of certain embodiments can also be used to detect items that are contextually similar but are not contextual duplicates. The process 800 might generate relatively high correlation scores for certain items (e.g., scores less than the contextual duplicate threshold) such that the items can be considered contextually similar but not contextually duplicate. These correlation scores can be used to determine which items to recommend to a user. For example, a pair of items having a correlation score of 0.7, in one embodiment, might not be contextual duplicates, but might be sufficiently similar such that a perceived user interest in one item of the pair could result in the other item being a good recommendation. If the user has searched for one of the items in the pair, for instance, the other item in the pair might be recommended to the user. In addition, contextually similar items (or even contextual duplicates) could be used to enhance search results by providing an item the searcher desires but did not explicitly search for. If a user searched for the keywords "Gucci dress shoe," a type of Italian-made shoe, for example, a contextually similar item such as a "Forzieri dress shoe" (another Italian brand) might be provided in addition to any Gucci shoe results.

Figure 9:
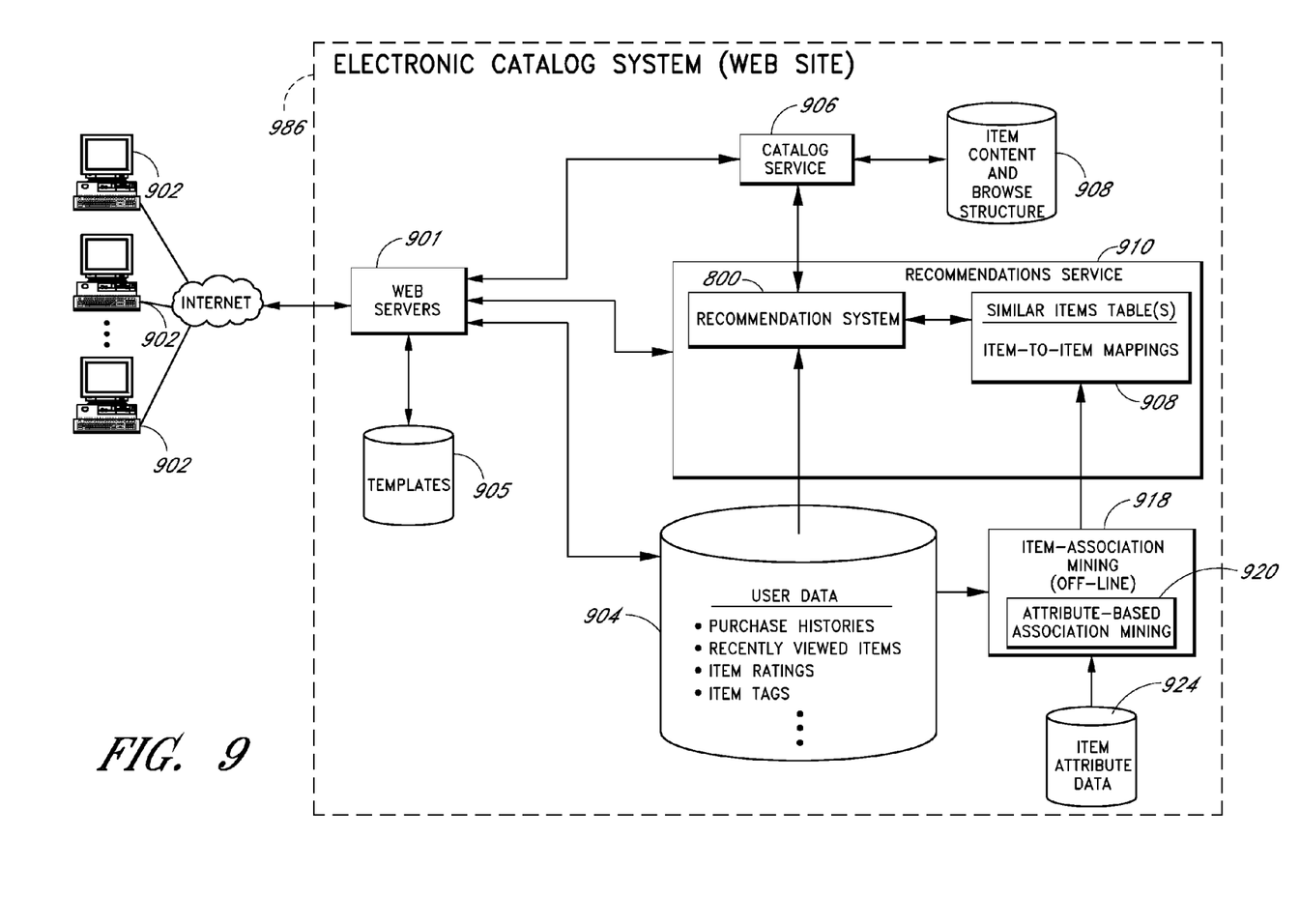
FIG. 9 illustrates one example of how the various association mining and recommendation features may be implemented in the context of a web-based electronic catalog system.

FIG. 9 illustrates how the various features described above may be implemented in the context of a web-based system that provides functionality for users to browse an electronic catalog of items and to select particular items for purchase and/or rental. As will be recognized, the various features of the disclosed embodiments can also be implemented in other types of systems, including, e.g., music download systems that recommend music titles based on users' music download histories, video rental sites that recommend video/DVD titles based on users video rental histories, news sites that recommend news articles based on users' news browsing histories, browser toolbar based systems that recommend web sites and other network resources based on users' web browsing histories, web services for providing recommendations, check-out/wallet services that enable users to pay for goods from various participating merchants, and Internet advertising systems.

The system shown in FIG. 9 includes one or more web server machines 901 that generate and serve pages of a host web site in response to page requests from user computing devices 902. The web servers 901 provide user access to a catalog of items represented in a database 908 or collection of databases. The items preferably include or consist of items that may be purchased and/or rented via the web site (e.g., book, music and video titles in physical or downloadable form; consumer electronics products; household appliances; magazine and other subscriptions, etc.). The database 908 may also store data regarding how the items are arranged within a hierarchical browse structure. Data regarding the catalog items and the browse structure is accessible via a catalog service 906, which may be implemented as a web service. The attribute data stored in the database 908 for a given item may, for example, include or consist of name-value pairs (e.g., title=The Da Vinci Code, director=Ron Howard, lead actor=Tom Hanks, etc.).

The system also includes a data repository 904 (e.g., one or more databases) that stores various types of user data, including identifiers of the items in each user's collection. For example, the data repository 904 may store users' purchase histories, movie rental histories, item viewing histories, item ratings, and item tags. The purchase, rental and viewing histories may be stored as lists of item identifiers together with associated event timestamps. The various types of user data may be accessible to other components of the system via a data service (not shown), which may be implemented as a web service.

The system also includes a recommendation service 910 that generates recommendations in real time in response to requests from users. The recommendations service 910 may use one or more "similar items" tables/datasets 908 to look up items that are similar or related to the items, together with associated data values indicating the strengths of such relationships. The similar items table(s) 908 may be generated off-line by an item association mining component 918 that analyzes users' purchase histories, item viewing histories, or some other type of user activity data, and detects and quantifies behavior-based associations between specific items. For instance, if purchase histories are used, item A may be mapped to item B in a purchase-based similar items table 908 if a relatively large number of the users who purchased item A also purchased item B.

The item association mining component 918 may also include an attribute-based association mining system 920. In an embodiment, the attribute-based association mining system 920 performs some or all of the features described above with respect to FIGS. 1 through 8. Hence, the attribute-based association mining system 920 analyzes attributes and/or other item data stored in an item data repository 924 to determine how well attributes of one item fit with the attributes of another. The attribute-based association mining system 920 can analyze item attributes once per day or other time period, each time a batch of item data is added to the repository 924, or at varying frequency based on how often item data is provided from vendors.

In an embodiment, the attribute-based association mining system 920 analyzes item attributes of all items in the electronic catalog system. In another embodiment, item-attribute analysis is performed on all items, but associations from this analysis are created only for behavior-deficient items or only for certain types of items (e.g., movies). In addition, the analysis might be performed separately for each type of item.

For example, movies might be compared only to other movies, apparel to other apparel, and so forth.

Other types of recommendation engines, including recommendation engines that do not use item-to-item mappings, may also be used by the recommendations service 910.

The electronic catalog system may also include services for handling various other types of tasks, such as user authentication, transaction processing, search query processing, storing user-assigned tags and ratings, processing of user-submitted sales listings, etc.

The web servers 901 use a data repository of web page templates 905 to dynamically generate web pages in response to browser requests. The templates directly or indirectly specify the service calls that are made to the services to, e.g., request data needed to generate the requested page. For instance, an appropriate template may be provided for generating recommendation pages of the type shown in FIG. 10, along with various other pages of the site.

When a user clicks on a link for viewing recommendations, a web server 901 requests recommendations for the user from the recommendations service 910. The recommendations service 910 then uses all or a portion of the user's activity data or collection (typically depending upon the context of the user's request) to generate the recommendations. As part of this process, the recommendations service 910 may use association scores (e.g., correlation scores), or association scores derived from correlation scores, to generate recommendations.

The services and other application components 900, 906, 910, 918, and 920 shown in FIG. 9 may be implemented in software code modules executed by any number of general purpose computers or processors, with different services optionally but not necessarily implemented on different machines interconnected by a network. The code modules may be stored in any type or types of computer storage, such as hard disk drives and solid state memory devices. The various data repositories 904, 905, 908, 924 may similarly be implemented using any type of computer storage, and may be implemented using databases, flat files, or any other type of computer storage architecture.

Figure 10:
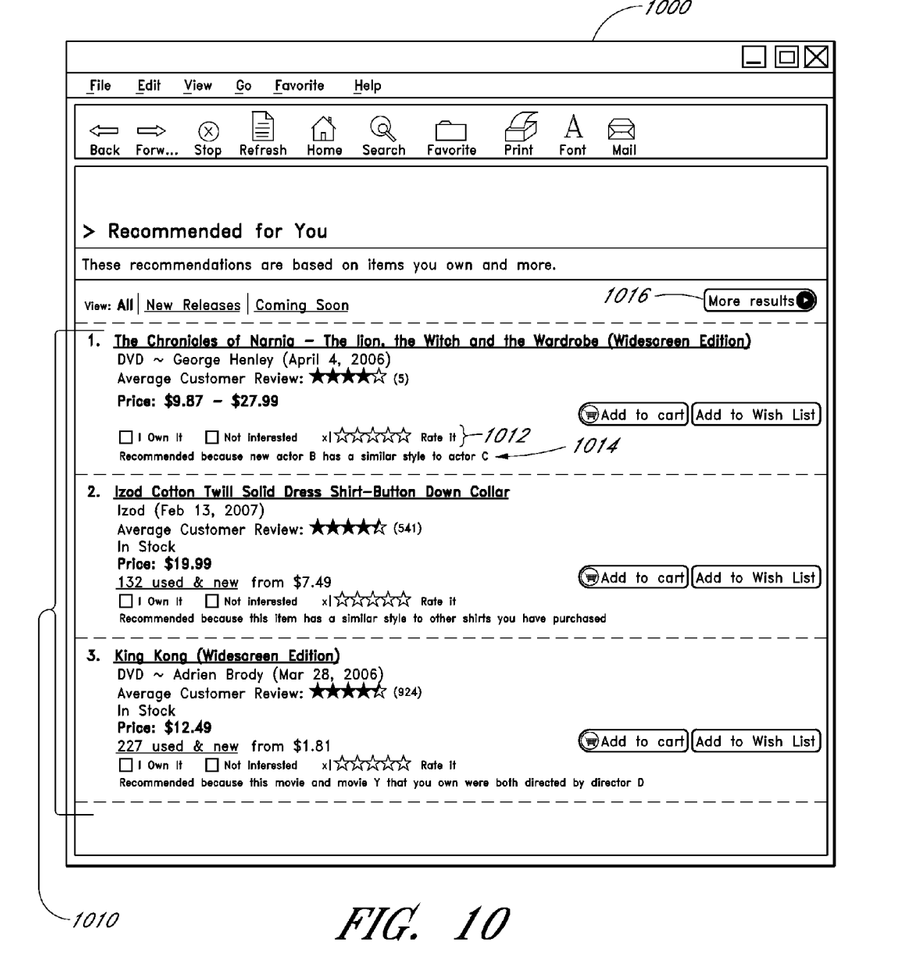
FIG. 10 illustrates a portion of a web page showing an example recommendation interface.

FIG. 10 illustrates a portion of a web page showing an example recommendation interface. The example recommendations page 1000 displays recommendations for a user. The recommendations page 1000 includes various details about the listed products 1010 (three products shown), and includes buttons for adding each product to an electronic shopping cart or wish list. In this example, the recommendation page 1000 also includes a set of controls 1012 for rating, indicating ownership of, and indicating a lack of interest in, each listed product 1010. The recommendations system may use this information and other information to improve the recommendations it makes. In an embodiment, this process is stateless, such that no information about which items have been recommended to which users needs be retained. A refresh option 1018 allows a user to see an updated list of recommendations, which may be updated when the user adjusts the controls 1012.

One or more reasons 1014 are displayed for recommending each item. For example, the movie item "The Chronicles of Narnia" includes the reason 1014 "Recommended because new actor B has a similar style to actor C." Implicit in this reason is the knowledge that the user has a preference for actor C, which may be detected by observing the user's browsing and/or purchase history. The reasons 1014 shown on the page 1000 provide compelling reasons for recommending items. A user that enjoys actor C, for instance, might be interested in buying a movie starring an actor with a similar style to actor C. Similarly, a dress shirt is recommended along with the reason "because this item has a similar style to other shirts you have purchased."

Each of the processes and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process blocks may be stored, persistently or otherwise, in any type of computer storage.

The various features and processes described above may be used independently of one another, or may be combined in various ways. All possible combinations and subcombinations are intended to fall within the scope of this disclosure. In addition, certain method or process steps may be omitted in some implementations.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any of the incorporated-by-reference materials.

What is claimed is:

1. A method of associating media works having related media contributors, the method comprising:
    by a computer system comprising computer hardware:
    identifying a first media work having a first contributor;
    identifying a second media work having a second contributor, the second contributor not being a contributor to the first media work, and the first contributor not being a contributor to the second media work; and
    calculating a degree of association between the first media work and the second media work based, at least in part, on an extent to which the first and second contributors co-contribute to one or more other media works, wherein calculating said degree of association between the first and second media works comprises calculating an association value that is dependent upon respective contribution roles of the first and second contributors in contributing to a third media work.

2. The method of claim 1, further comprising recommending one or more items to a user based at least partly on the calculated degree of association between the first media work and the second media work.

3. The method of claim 1, wherein calculating the degree of association comprises taking into consideration acting roles of the first and second contributors in said one or more other media works.

4. The method of claim 1, wherein the first and second media works are movies and the first and second contributors are actors in the movies.

5. The method of claim 1, wherein the media works comprise musical works.

6. The method of claim 1, wherein the computer system comprises a plurality of physical computers.

7. The method of claim 1, wherein calculating said degree of association between the first and second media works comprises identifying a third media work to which the first and second contributors co-contributed, and determining respective contribution roles of the first and second contributors in contributing to the third media work.

8. The method of claim 1, wherein calculating said degree of association between the first and second media works comprises calculating an association value that is dependent upon types of contributions made by the first and second contributors to each of a plurality of other media works to which the first and second contributors co-contributed.

9. A method of associating media works having related media contributors, the method comprising:
by a computer system comprising computer hardware:
identifying a first media work having a first contributor;
identifying a second media work having a second contributor, the second contributor not being a contributor to the first media work, and the first contributor not being a contributor to the second media work; and
calculating a degree of association between the first media work and the second media work based, at least in part, on an extent to which the first and second contributors co-contribute to one or more other media works, wherein calculating said degree of association comprises (a) calculating a first degree of fit between the first contributor and the second media work, (b) calculating a second degree of fit between the second contributor and the first media work, and (c) calculating an association value that is dependent upon the first and second calculated degrees of fit, said association value representing said degree of association between the first and second media works.

10. A system capable of detecting associations between works, the system comprising:
a computer data repository that stores attribute data for each of a plurality of works, said attribute data specifying contributors to the works; and
an association mining system comprising one or more processors, said association mining system configured to use the attribute data to determine degrees of association between particular works by a process that comprises:
identifying a first work having a first contributor;
identifying a second work having a second contributor; and
calculating an association value representing a degree of association between the first work and the second work, said association value being dependent upon an extent to which the first and second contributors have co-contributed to one or more other works, as determined from said attribute data said association value additionally dependent upon respective contribution roles of the first and second contributors in contributing to a third work.

11. The system of claim 10, wherein the first contributor is not a contributor to the second work, and the second contributor is not a contributor to the first work.

12. The system of claim 10, further comprising a recommendation system that uses association values calculated according to said process to select works to recommend to users.

13. The system of claim 10, wherein the first contributor is an actor in the first work, and the second contributor is an actor in the second work.

14. The system of claim 10, wherein the works are movies.

15. The system of claim 10, wherein the association value is dependent upon types of contributions made by the first and second contributors to each of a plurality of works to which the first and second contributors co-contributed.

16. The system of claim 10, wherein the association value is additionally dependent upon an extent to which other contributors to the first and second works have co-contributed to works other than the first and second works.

17. A system capable of detecting associations between works, the system comprising:
a computer data repository that stores attribute data for each of a plurality of works, said attribute data specifying contributors to the works; and
an association mining system comprising one or more processors, said association mining system configured to use the attribute data to determine degrees of association between particular works by a process that comprises:
identifying a first work having a first contributor;
identifying a second work having a second contributor; and
calculating an association value representing a degree of association between the first work and the second media, said association value being dependent upon an extent to which the first and second contributors have co-contributed to one or more other works, as determined from said attribute data;
wherein the association mining system, in calculating the association value, is configured to (a) calculate a first degree of fit between the first contributor and the second work, (b) calculate a second degree of fit between the second contributor and the first work, and (c) calculate the association value such that the association value is dependent upon the first and second calculated degrees of fit.

18. Non-transitory computer storage that stores executable code that directs a computer system to determine a degree of association between movies by a process that comprises:
identifying a first movie having a first actor;
identifying a second movie having a second actor;
determining, based on a data repository of movie attribute data, an extent to which the first actor and second actor co-contributed as actors to one or more other movies; and
calculating an association value that is dependent upon said extent to which the first actor and second actor have co-contributed as actors to one or more other movies, and that is additionally dependent upon acting roles of the first and second actors in co-contributing to the one or more other movies, said association value representing a degree of association between the first and second movies.

19. The non-transitory computer storage of claim 18, wherein the association value is additionally dependent upon an extent to which other contributors to the first and second movies have co-contributed to other movies.

20. The non-transitory computer storage of claim 18, wherein the first actor is not a contributor to the second movie, and the second actor is not a contributor to the first movie.

21. The non-transitory computer storage of claim 18, in combination with said computer system, wherein the computer system is programmed with said executable code to implement said process.

* * * * *